(12) United States Patent  
Venkatesan et al.

(10) Patent No.: US 10,880,769 B2  
(45) Date of Patent: Dec. 29, 2020

(54) FINE TIMING MEASUREMENT FOR TIME SYNCHRONIZATION

(71) Applicant: Intel IP Corporation, Santa Clara, CA (US)

(72) Inventors: Ganesh Venkatesan, Hillsboro, OR (US); Carlos Aldana, Santa Clara, CA (US); Kevin Stanton, Hillsboro, OR (US)

(73) Assignee: Intel IP Corporation, Santa Clara, CA (US)

( * ) Notice: Subject to any disclaimer, the term of this patent is extended or adjusted under 35 U.S.C. 154(b) by 129 days.

(21) Appl. No.: 16/185,882

(22) Filed: Nov. 9, 2018

(65) Prior Publication Data

US 2019/0082345 A1 Mar. 14, 2019

Related U.S. Application Data

(60) Provisional application No. 62/583,926, filed on Nov. 9, 2017.

(51) Int. Cl.
| | |
|---|---|
| *H04W 24/10* | (2009.01) |
| *H04W 56/00* | (2009.01) |
| *H04W 84/12* | (2009.01) |
| *H04W 64/00* | (2009.01) |

(52) U.S. Cl.
CPC ......... *H04W 24/10* (2013.01); *H04W 56/001* (2013.01); *H04W 64/00* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2016/0044524 A1* | 2/2016 | Ben-Haim | H04W 24/10 370/252 |
| 2016/0119805 A1* | 4/2016 | Aldana | H04L 43/106 370/252 |
| 2016/0241373 A1* | 8/2016 | Marri Sridhar | H04W 24/10 |
| 2019/0089472 A1* | 3/2019 | Zhang | H04N 21/8547 |

* cited by examiner

*Primary Examiner* — Jutai Kao
(74) *Attorney, Agent, or Firm* — Eversheds Sutherland (US) LLP (57) ABSTRACT

This disclosure describes systems, methods, and devices related to fine timing measurement (FTM) time synchronization and location estimation. A device may determine a FTM request received from an initiator device, wherein the first FTM request comprises a first trigger field. The device may determine to establish a first FTM session with the initiator device based on the first trigger field. The device may identify a second FTM request received from the initiator device, wherein the second FTM request comprises a second trigger field. The device may determine to establish a second FTM session with the initiator device based on the first trigger field and the second trigger field.

20 Claims, 8 Drawing Sheets

FIG. 8

FINE TIMING MEASUREMENT FOR TIME SYNCHRONIZATION

CROSS-REFERENCE TO RELATED APPLICATION(S)

This application claims the benefit of U.S. Provisional Application 62/583,926, filed on Nov. 9, 2017, the disclosure of which is incorporated herein by reference as if set forth in full.

TECHNICAL FIELD

This disclosure generally relates to systems and methods for wireless communications and, more particularly, to fine timing measurement (FTM) for time synchronization.

BACKGROUND

Advances in wireless communications require the use of efficient batteries to allow users to utilize their devices for longer times between recharges or replacement. The exchange of data in wireless communications consumes power and having repeated recharges or installation of dedicated power lines may result in a relatively negative user experience.

DETAILED DESCRIPTION

Example embodiments described herein provide certain systems, methods, and devices for location determination, including, but not limited to, the IEEE 802.11 family of standards.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

A Wi-Fi device may perform a measurement procedure, known as fine timing measurement (FTM), in order to allow the Wi-Fi device (e.g., FTM initiator) to obtain its range to another device, such as an access point or an FTM responder. The FTM procedure is an IEEE 802.11 protocol introduced to support location determination based on range measurement to multiple known responding devices and execution of location determination techniques, for example, triangulation, trilateration, etc. FTM operates in both associated and unassociated mode. REVmc protocol is defined for both very high throughput (VHT) (e.g., IEEE 802.11ac) and high throughput (HT) (e.g., IEEE 802.11n) station devices (STAs) but is essential a single input single output (SISO) protocol using pre-VHT compatible format acknowledgment (ACK) (e.g., Non-HT duplicate ACK) and one transmit chain for each measurement.

In order to execute the FTM protocol between two devices, an FTM session is required to be setup, and the FTM session defines a set of parameters that govern the execution of the FTM protocol. The FTM protocol could also be used for time synchronization if an FTM session is setup and the resulting timestamps at the FTM initiator are passed to IEEE 802.1AS layer above the 802.11 MAC. For example, in a robotic application where the movement of the robot has to be coordinated with the task (e.g., filling up a box), time synchronization is important. However, starting an FTM session for time synchronization will abort an ongoing FTM session (that may have been setup for Location estimation) or vice versa. That is a request to negotiate a new FTM session aborts the currently ongoing FTM session.

There are a few problems with this. An arbitration layer above the 802.11 MAC is required to prevent termination of an ongoing FTM session due to a request to establish a new FTM session. Further, the timestamps generated can be used both for location services and time synchronization instead of generating a set of timestamps exclusively for location services and a distinct set of timestamps for time synchronization.

Example embodiments of the present disclosure relate to systems, methods, and devices for location determination.

In one embodiment, an FTM for time synchronization system may facilitate a mechanism to establish an FTM session and use it for both location services and time synchronization. With this approach the two issues listed above, for example, an ongoing FTM session is aborted due to an incoming request and the execution of the FTM protocol only once for location services or only once for time synchronization, are avoided. This is accomplished without the need to have an arbitration layer to co-ordinate the invocation of FTM sessions.

Currently there is no mechanism to co-ordinate the use of FTM for location services and time synchronization.

A few approaches included an arbitration layer to execute above the 802.11 layer. This layer has knowledge of the FTM session that is currently setup in the 802.11 layer and will either deny or delay an incoming request for a new FTM session until the currently setup FTM session completes. It should be noted that the currently setup FTM session may persist for a long time resulting in the denial of FTM for the incoming request. However, this does not allow for concurrent FTM sessions.

In an FTM procedure, an initiator sends an initial fine timing measurement request (iFTMR) and the responder responds with initial FTM (iFTM). If the status code in the iFTM is SUCCESS, a FTM session is established between the initiator and the responder. If the initiator sends another iFTMR (initial FTM request with FTM parameters element included), the FTM session established above is terminated/aborted.

In one or more embodiments, an FTM for time synchronization system may facilitate that if there are no ongoing FTM sessions, the incoming request (Req_i) for a new FTM session is accepted. If there is an ongoing FTM session (Req_o), the ongoing FTM session is leveraged to serve the new request; and upon the termination of the ongoing FTM session, a new session matching the incoming request (Req_i).

Leveraging may include prioritizing a location service and treating a time synchronization service as secondary to the location service. If there is an ongoing location services FTM session, the FTM for time synchronization system may reuse it for time synchronization. If there are no ongoing location services FTM session, the FTM for time synchronization system may start a FTM session for time synchronization. If a request for a FTM session for location services is received, the FTM for time synchronization system may cache the operating parameters to be used for the time synchronization FTM session, then abort the ongoing time synchronization FTM session and start a new one for location services, and if the location services FTM session ends, the FTM for time synchronization system may start a time synchronization FTM session with the cached parameters.

In one or more embodiments, an FTM for time synchronization system may set a trigger field within the iFTMR in order to indicate one or more statuses to the responder. For example, the trigger field may contain 8 bits, where setting the various bits of the trigger field would indicate to the responder on how to handle one or more FTM sessions (location service or time synchronization service). For example, setting the trigger field to a value of 0 may indicate to the responder to stop sending FTM frames and end the corresponding FTM session that is serving the location services, setting the trigger field to a value of 1 may indicate to the responder to start a burst, such that, in initial FTMR indicates to abort any ongoing FTM sessions serving location services and negotiate a new one for location services. This may not have an impact on any ongoing FTM session serving time synchronization. Setting the trigger field to a value of 2 may indicate to the responder to stop sending FTM frames and end the corresponding FTM session that is serving time synchronization. Setting the trigger field to a value of 3 may indicate to the responder to start a burst, such that, in initial FTMR indicates to abort any ongoing FTM sessions serving time synchronization and negotiate a new one for time synchronization. This may not have an impact on any ongoing FTM session serving location services. Further, the values 6 or 7 of the trigger field are used to stop (terminate) and start/continue 'leveraged' mode FTM sessions. Values 4 and 5 may be reserved.

In one or more embodiments, an FTM for time synchronization system may set the session identification (ID) associated with an FTM session to 0 or 1. For example, a session ID of 0 indicates an FTM session for location services, while setting the session ID to 1 an indicates FTM session for time synchronization.

The above descriptions are for purposes of illustration and are not meant to be limiting. Numerous other examples, configurations, processes, etc., may exist, some of which are described in greater detail below. Example embodiments will now be described with reference to the accompanying figures.

Figure 1:
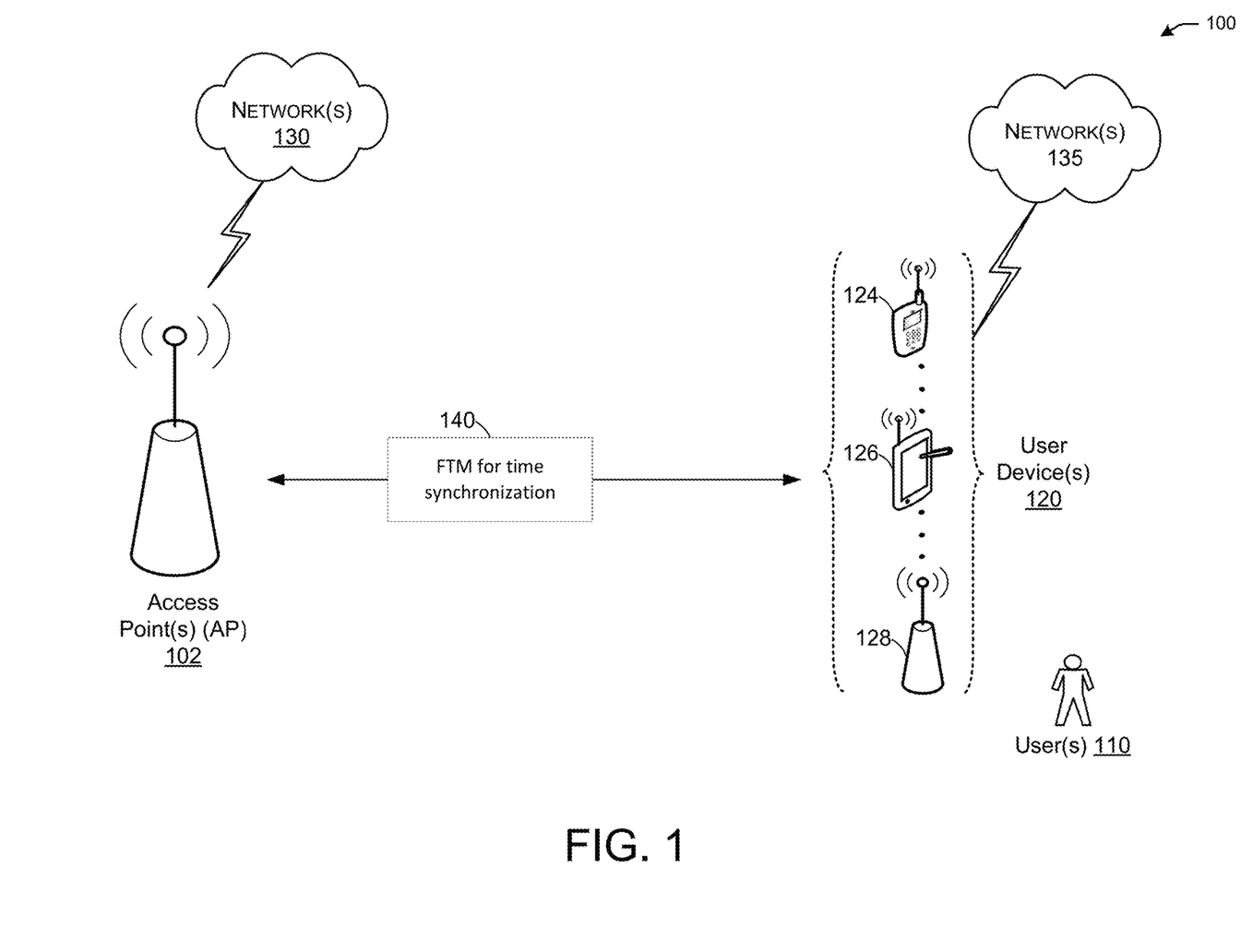
FIG. 1 depicts a network diagram illustrating an example network environment for fine timing measurement (FTM) for time synchronization, in accordance with one or more example embodiments of the present disclosure.

FIG. 1 is a network diagram illustrating an example network environment of location determination, according to some example embodiments of the present disclosure. Wireless network 100 may include one or more user devices 120 and one or more responding device(s) (e.g., AP 102), which may communicate in accordance with IEEE 802.11 communication standards. The user device(s) 120 may be mobile devices that are non-stationary (e.g., not having fixed locations) or may be stationary devices.

Figure 7:
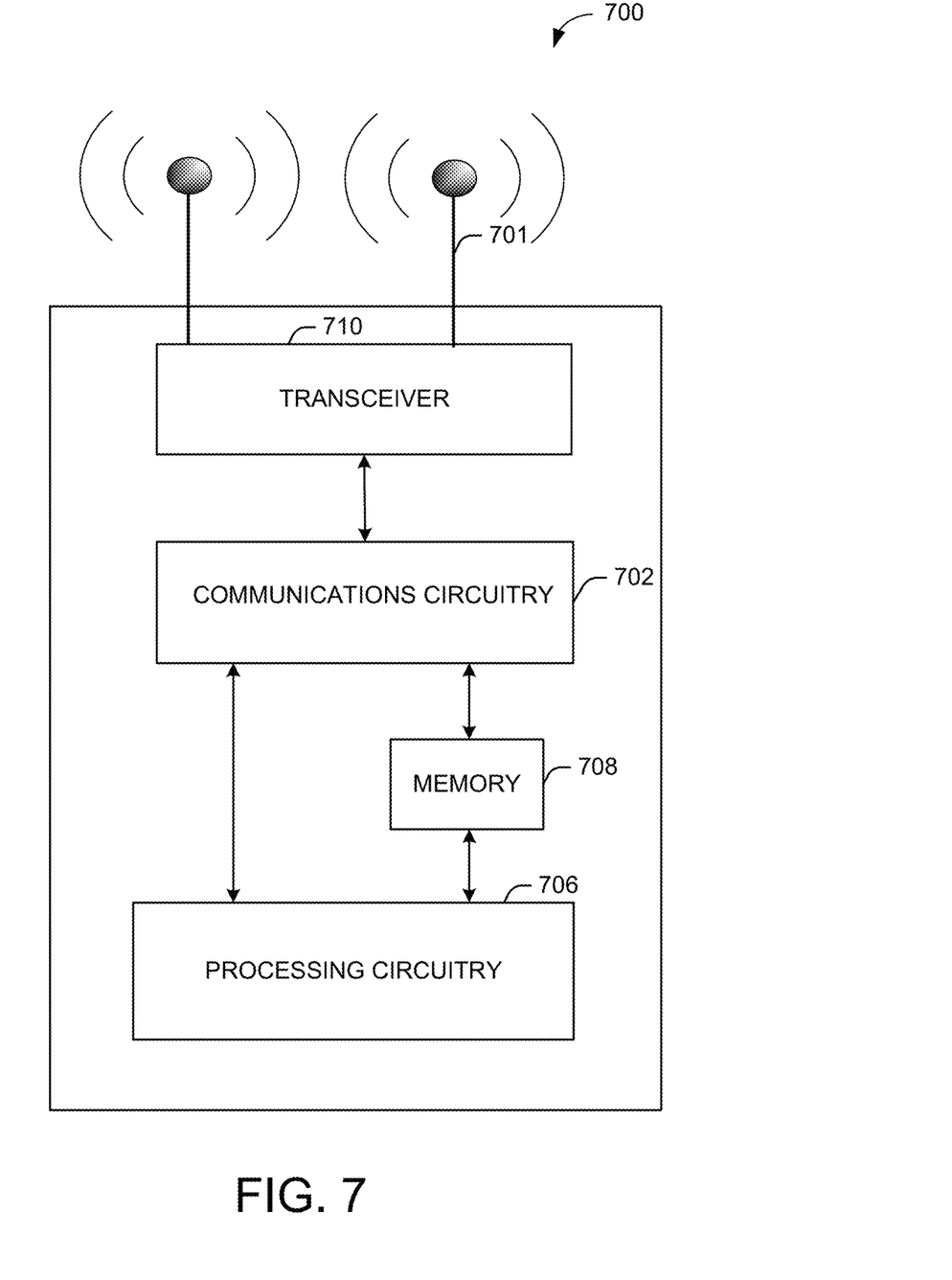
FIG. 7 depicts a functional diagram of an example communication station that may be suitable for use as a user device, in accordance with one or more example embodiments of the present disclosure.
Figure 8:
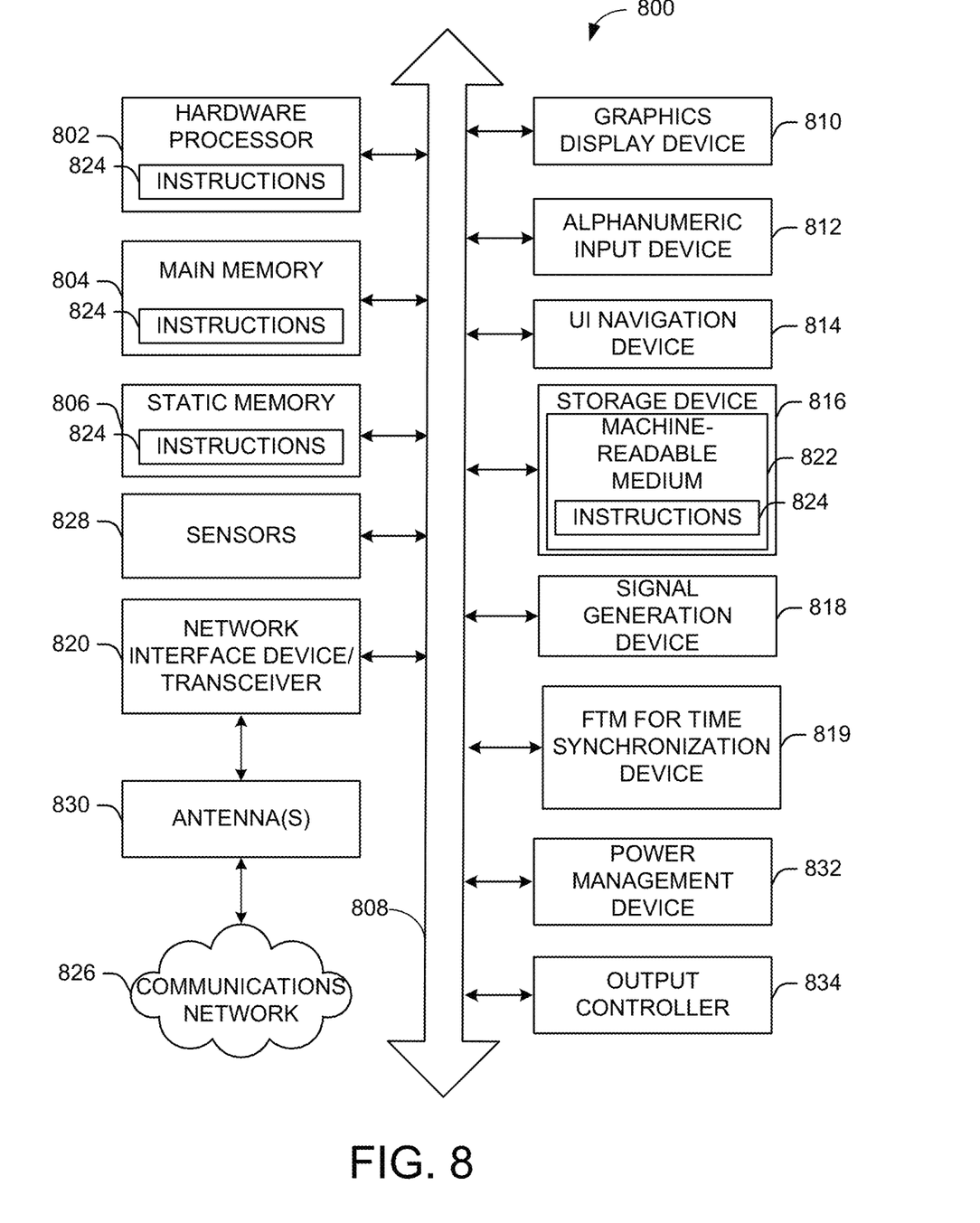
FIG. 8 depicts a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 7 and/or the example machine/system of FIG. 8.

One or more illustrative user device(s) 120 and/or AP 102 may be operable by one or more user(s) 110. The user device(s) 120 (e.g., 124, 126, or 128) and/or AP 102 may include any suitable processor-driven device including, but not limited to, a mobile device or a non-mobile, e.g., a static, device. The AP 102 may be able to determine if any of the user devices 120 is associated with the AP or if any of the user devices 120 is an unassociated user device. An associated device is a device that is known to the AP 120 and an unassociated device is a user device unknown to the AP 120. For example, user device(s) 120 and/or AP 102 may include, a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile Internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

Any of the user device(s) 120 (e.g., user devices 124, 126, 128), and AP 102 may be configured to communicate with each other via one or more communications networks 130 and/or 135 wirelessly or wired. The user device(s) 120 may also communicate peer-to-peer or directly with each other with or without the AP 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennas. The one or more communications antennas may be any suitable type of antennas corresponding to the communications protocols used by the user device(s) 120 (e.g., user devices 124, 126 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP 102.

Any of the user device(s) 120 (e.g., user devices 124, 126, 128), and AP 102 may be configured to perform directional transmission and/or directional reception in conjunction with wirelessly communicating in a wireless network. Any of the user device(s) 120 (e.g., user devices 124, 126, 128), and AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP 102 may be configured to perform any given directional transmission towards one or more defined transmit sectors. Any of the user device(s) 120 (e.g., user devices 124, 126, 128), and AP 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP 102 may be configured to use all or a subset of its one or more communications antennas to perform MIMO beamforming.

Any of the user devices 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

When an AP (e.g., AP 102) establishes communication with one or more user devices 120 (e.g., user devices 124, 126, and/or 128), the AP 102 may communicate in a downlink direction and the user devices 120 may communicate with the AP 102 in an uplink direction by sending data frames in either direction. The user devices 120 may also communicate peer-to-peer or directly with each other with or without the AP 102.

In one embodiment, and with reference to FIG. 1, a user device 120 may perform FTM for time synchronization 140 with an AP 102. User device 120 may be considered as an initiating device, also referred to as a station device (STA), and the AP 102 may be considered as a responding device.

During a communication between AP 102 and one or more user devices 120, the one or more user devices 120 may be associated or unassociated with the AP 102. The one or more user devices 120 may initiate a location initiation procedure in order to perform location determination.

With reference to FIG. 1, the one or more user devices 120 and/or the AP 102 may perform a location estimation procedure. The location estimation procedure may, for example, determine the location of an initiating device (e.g., the user devices 120 or STA). In the case where the one or more user devices 120 are un-associated with the AP 102, two phases for the location estimation procedure may be defined. The first phase may consist of capability exchange and preliminary positioning agreement negotiation between the unassociated user device 120 and AP 102, through exchange of FTM Request and Response frames for instance. The second phase consist of the positioning measurement phase. This phase consists in actually allowing multiple user devices 120 to perform positioning measurements.

In one or more embodiments, the one or more user devices 120 and/or the AP 102 may perform a time synchronization procedure. The time synchronization procedure may utilize the FTM procedure (exchanging FTM bursts) to collection timing information that would be useful for a device to use in order to synchronize with other devices.

In one or more embodiments, both location estimation procedure and time synchronization may be performed concurrently.

It is understood that the above descriptions are for purposes of illustration and are not meant to be limiting.

Figure 2:
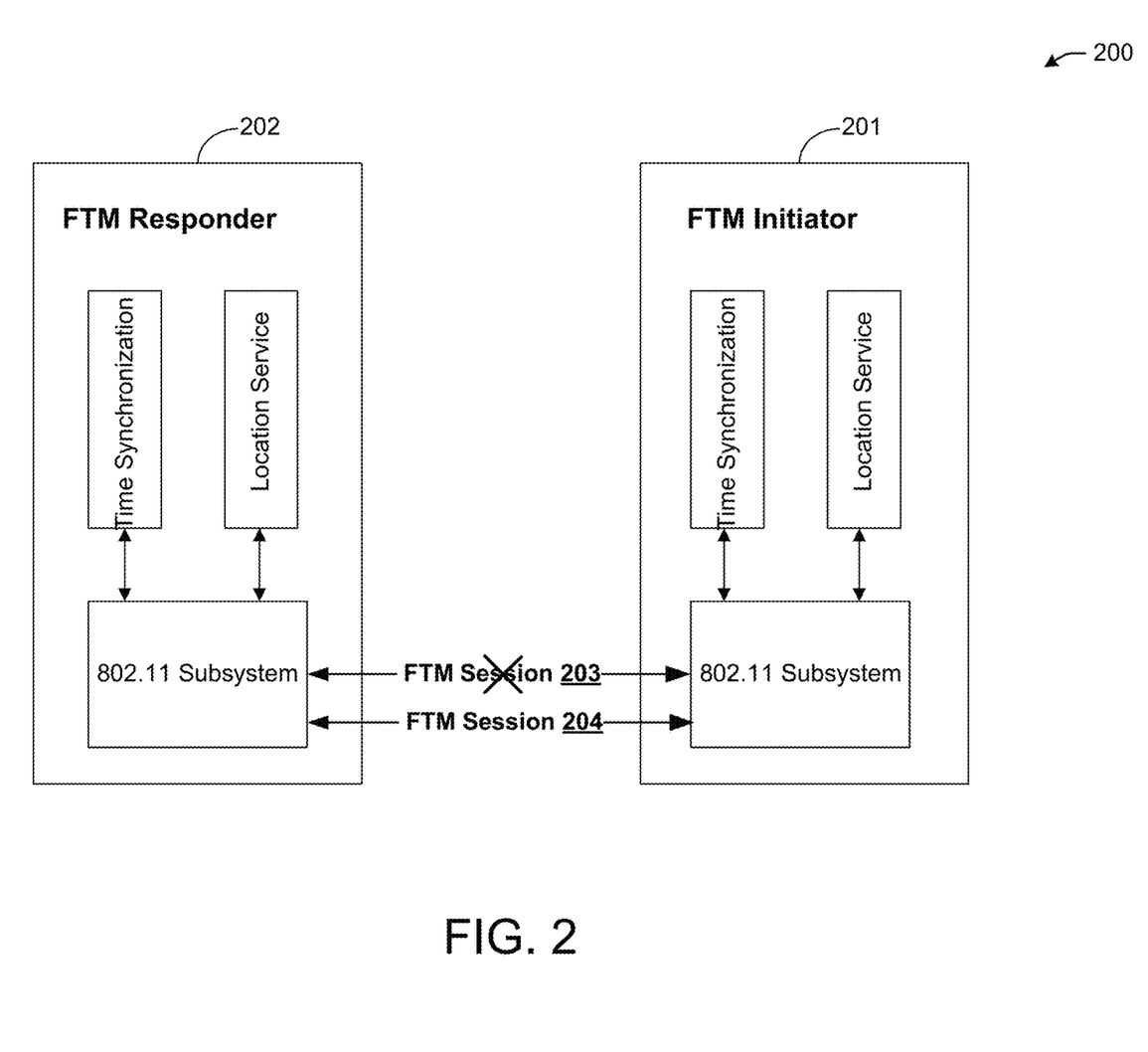
FIG. 2 depicts an illustrative flow diagram for location determination using fine timing measurement (FTM).

FIG. 2 depicts an illustrative schematic diagram for establishing an FTM session.

Referring to FIG. 2 there is shown an FTM initiator 201 and an FTM responder 202 that may perform one or more FTM procedures. For example a time synchronization and/or a location service FTM procedures.

However, FIG. 2 describes the situation, where ongoing FTM session (e.g., either FTM session 203 or FTM session 204) is aborted when a new request is received, in the context of IEEE 802.11-2016. For example, an FTM session may get established between the FTM initiator and the FTM responder to serve the location services application at the FTM initiator. When the time synchronization application in the FTM initiator requests an FTM session, the current FTM session aborts and a new FTM session gets established. As a result the location services application at the FTM initiator does not get served.

Figure 3:
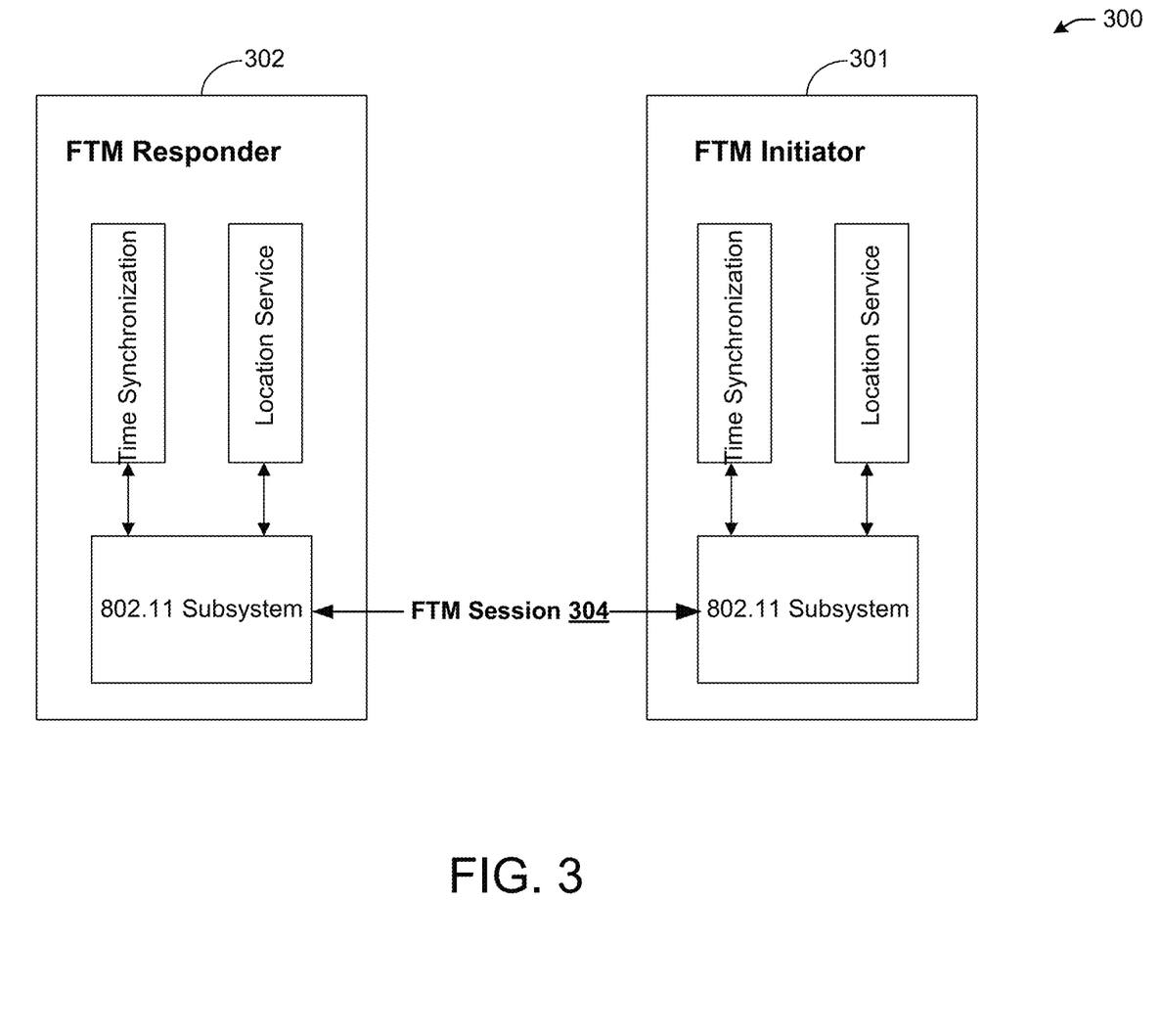
FIG. 3 depicts an illustrative schematic diagram for leveraging ongoing FTM session to serve new request(s), in accordance with one or more example embodiments of the present disclosure.

It is understood that the above descriptions are for purposes of illustration and are not meant to be limiting.

cation based on the parameters that govern the ongoing FTM session. This may not perfectly match what the time synchronization application requested but still provides some level of service to the time synchronization application while not aborting the ongoing FTM session that is serving the location services. If the ongoing FTM session terminates, the 802.11 subsystem starts a new FTM session with the FTM responder 302 using the parameters cached from the incoming request from the time synchronization application. If the ongoing FTM session 304 terminates a FTM session for time synchronization will be established using the parameters cached when the time synchronization application requested a FTM session.

Alternatively, the time synchronization application can signal the need for an independent concurrent FTM session that exclusively serves time synchronization. This can be signaled by setting the trigger field in the FTM request frame to a value to 3. In this case, a non-zero session ID (1) is assigned to the FTM session serving the time synchronization application and is used in all FTM frame exchanges to distinguish these FTM frames from those exchanged in the FTM session serving location services (session ID is set to 0 for these frames) as shown in Table 1 below.

TABLE 1

| Trigger Field | | | |
|---|---|---|---|
| B2 | B1 | B0 | Description |
| 0 | 0 | 0 | Stop (and terminate) the location services FTM session |
| 0 | 0 | 1 | Start/continue the location services FTM session. Note that the same FTM session may serve the time synchronization application but with parameters defined by the location services request. |
| 0 | 1 | 0 | Stop (and terminate) the time synchronization FTM session. Note this FTM session exclusively served time synchronization. Such terminations could happen when while a time synchronization FTM session is ongoing, a request for a FTM session from location services is received. |
| 0 | 1 | 1 | Start/continue a FTM session to exclusively serve time synchronization. In this mode of operation, an FTM session ID of 1 is required to distinguish FTM frames that are serving the time synchronization application from those that are serving the location services (whose Session ID is 0); sent from the FTM Responder to the FTM Initiator. The FTM session ID corresponding to the FTM session catering to the location services is set to zero. This is required for backward compatibility. The FTM session ID corresponding to the FTM session catering to the time synchronization function shall be set to 1. It is assigned and sent from the FTM Responder to the FTM Initiator in the initial FTM frame. All subsequent FTM frames corresponding to the FTM session catering to the time synchronization function shall also carry this FTM session ID. |
| 1 | 0 | 0 | Not Used (Reserved) |
| 1 | 0 | 1 | Not Used (Reserved) |
| 1 | 1 | 0 | Stop serving the time synchronization application. The FTM session will continue to serve location services |
| 1 | 1 | 1 | Start serving the time synchronization application in addition to serving location services. Note in these cases the service to the time synchronization application is limited by the parameters that define the FTM session serving location services. |

FIG. 3 depicts an illustrative schematic diagram for leveraging ongoing FTM session to serve new request(s), in accordance with one or more example embodiments of the present disclosure.

Referring to FIG. 3, there is shown an FTM session 304 between an FTM initiator 301 and an FTM responder 302, where the FTM session 304 gets established as in the case in FIG. 2. However, when the time synchronization application in the FTM initiator 301 requests an FTM session, the 802.11 subsystem in the FTM initiator 301 caches the incoming request and serves the time synchronization appli- FIG. 4 depicts an illustrative schematic diagram for FTM session Establishment and the use of Session IDs, in accordance with one or more example embodiments of the present disclosure.

Figure 4:
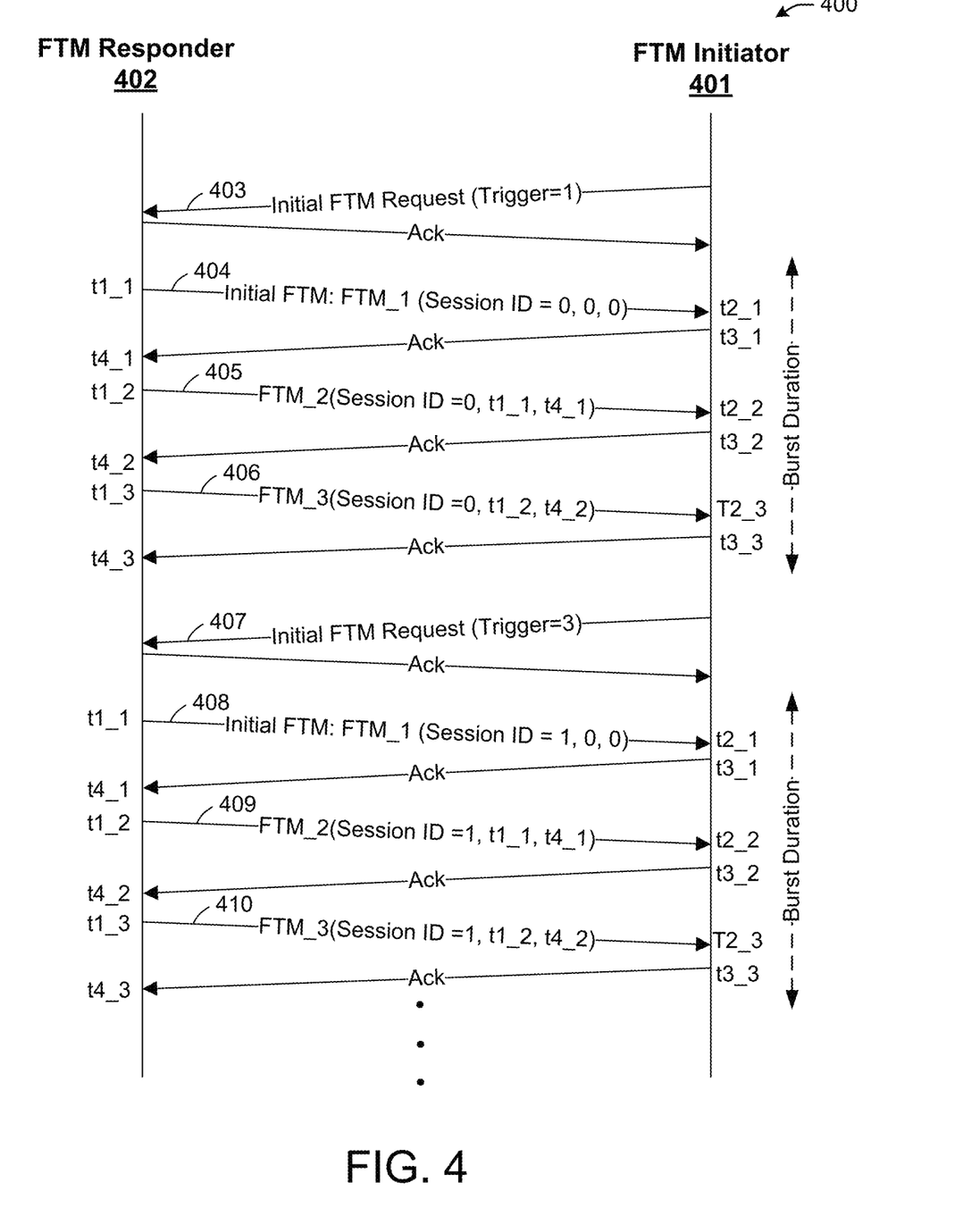
FIG. 4 depicts an illustrative schematic diagram for FTM session Establishment and the use of Session IDs, in accordance with one or more example embodiments of the present disclosure.

Referring to FIG. 4, there is shown two FTM sessions between an FTM initiator 401 and an FTM responder 402.

The first FTM session may set up by the FTM initiator 401 sending an initial FTM request (iFTMR) 403 to the FTM responder 402. A trigger field may be set within the iFTMR 403 in order to indicate one or more statuses to the FTM responder 402. For example, the trigger field may contain 8 bits, where setting the various bits of the trigger field would indicate to the FTM responder 402 on how to handle one or more FTM sessions (location service or time synchronization service). In the example of FIG. 4, the trigger field is set to a value of 1 in the iFTMR 403 to indicate to the FTM responder 402 to start a burst, such that, the iFTMR indicates to abort any ongoing FTM sessions serving location services and negotiate a new one for location services. After receiving the FTM responder 402 receives the iFTMR 403, the FTM responder 402 would acknowledge the reception of that frame by sending an ACK frame. During a burst duration, the FTM responder 402 and the FTM initiator 401 would exchanges FTM frames to collect timing information (e.g., t1, t2, t3, and t4) at various instances (e.g., t1_1, t2_1, t3_1, t4_1). In this case, the initial FTM 404 is sent by the FTM Responder 402 at time t1_1. The initial FTM 404 will include a session ID associated with the iFTMR. Since the trigger field was set to a value of 1 in the iFTMR 403, the FTM responder 402 allocates and assigns a session ID equal to "0" for location services and includes that session ID to the FTM initiator 401. After the FTM initiator 401 receives the initial FTM 404, it would send an ACK frame. The FTM responder 402 would then send a second FTM frame 405, which also includes the session ID of "0" since these FTM frames are in association with the requested location service FTM procedure. The second FTM frame 405 will also include timing information that is captured at this point, which are t1_1 and t4_1. Again an ACK frame is sent to acknowledge the reception of the second FTM frame 405 at the FTM initiator 401. The FTM responder 402 would continue to send FTM frames (e.g., a third FTM frame 406) to include the rest of the timing information (e.g., t1_2 and t4_2) and so on. The example of FIG. 4 shows that after sending the ACK frame to the third FTM frame 406, the FTM initiator 401 decides to send a request for establishing a second session, in this case, a timing synchronization session. For that reason, the FTM initiator 401 sends an iFTMR 407 with a trigger field set to a value of 3. Setting the trigger field to a value of 3 indicates to the FTM responder 402 to start a burst, which indicates to abort any ongoing FTM sessions serving time synchronization and negotiate a new one for time synchronization. This may not have an impact on any ongoing FTM session serving location services. Therefore, since the ongoing session is an FTM session serving location services, the ongoing session is not aborted. The FTM responder 402 acknowledges the reception of the iFTMR and then sends an iFTM frame 408 with a new session ID equal to "1" indicating an allocation and an assignment of a session ID for a new FTM session serving time synchronization. The FTM responder 402 would then send a second FTM frame 409 which also includes the session ID of "1" since these FTM frames are in association with the requested location service FTM procedure. The second FTM frame 409 will also include timing information that is captured at this point, which are t1_1 and t4_1. Again, an ACK frame is sent to acknowledge the reception of the second FTM frame 409 at the FTM initiator 401. The FTM responder 402 would continue to send FTM frames (e.g., a third FTM frame 410) to include the rest of the timing information (e.g., t1_2 and t4_2) and so on.

Leveraging may include prioritizing a location service and treating a time synchronization service as secondary to the location service. If there is an ongoing location services FTM session (e.g., FTM Session ID 0), the FTM for time synchronization system may reuse it for time synchronization (e.g., FTM session ID 1).

It should be understood that although only one burst duration for each session ID is shown, there may be additional burst duration for these session IDs or for other session IDs.

Figure 5:
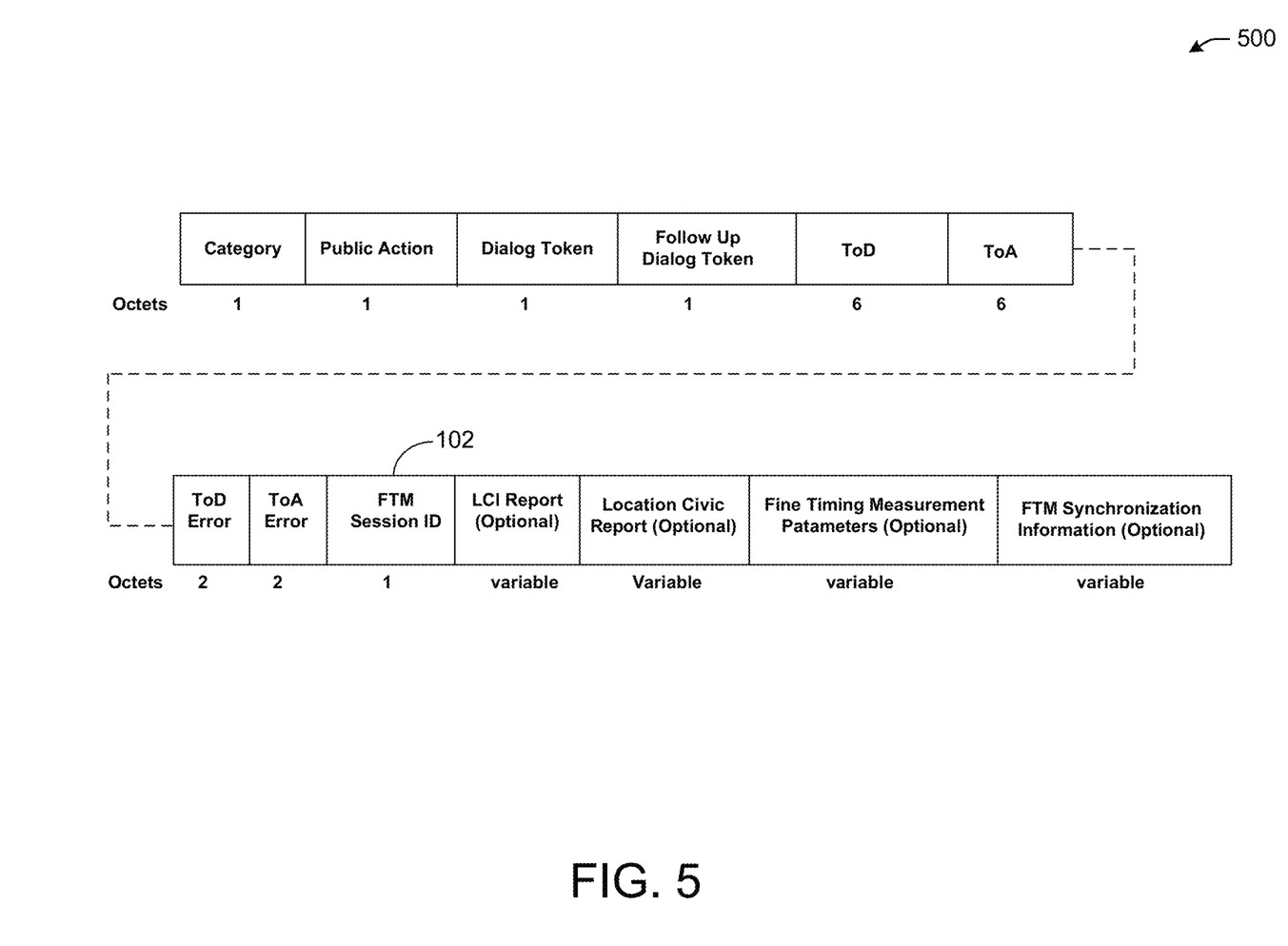
FIG. 5 depicts an illustrative schematic diagram for FTM for time synchronization, in accordance with one or more example embodiments of the present disclosure.

FIG. 5 depicts an illustrative schematic diagram for FTM for time synchronization, in accordance with one or more example embodiments of the present disclosure.

Referring to FIG. 5, there is shown an FTM frame 500 that comprises one or more fields including an FTM session ID field.

For example, FTM frames that are exchanged between a responder and an initiator devices could include the FTM session ID in order to allow a management of the data being collected with respect to the FTM session being run. For example, in the case of FTM location service, the FTM session ID may be allocated by the responder device. The FTM session ID in that case would be equal to 0. Then the FTM frames sent between the responder and the initiator will use the session ID of 0 in order to identify that the FTM session is for location services. However, if another FTM request comes in from the initiator device, the responder may allocate and assign a second session ID. If the FTM session is associated with time synchronization, then the session ID may be equal to 1. Then the FTM frames sent between the responder and the initiator will use the session ID of 1 in order to identify that the FTM session is for time synchronization. It is understood that the above descriptions are for purposes of illustration and are not meant to be limiting.

Figure 6:
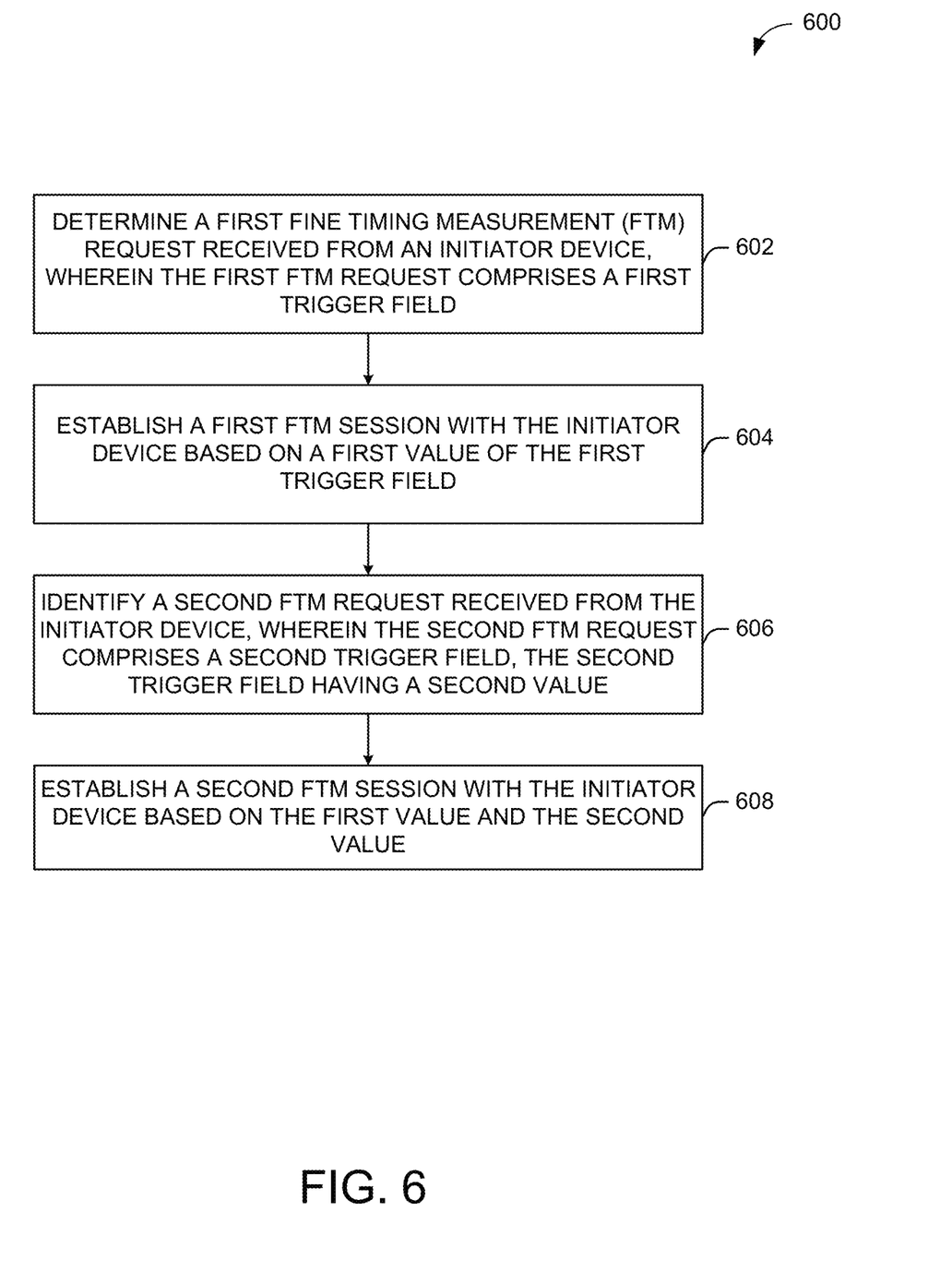
FIG. 6 depicts a flow diagram of illustrative process for FTM for time synchronization, in accordance with one or more example embodiments of the present disclosure.

FIG. 6 illustrates a flow diagram of illustrative process 600 for an illustrative FTM for time synchronization, in accordance with one or more example embodiments of the present disclosure.

At block 602, an initiator device (e.g., the user device(s) 120 and/or the AP 102 of FIG. 1) may determine a first fine timing measurement (FTM) request received from an initiator device, wherein the first FTM request comprises a first trigger field. For example, the initiator device may set a trigger field within the iFTMR in order to indicate one or more statuses to the responder. For example, the trigger field may contain 8 bits, where setting the various bits of the trigger field would indicate to the responder on how to handle one or more FTM sessions (location service or time synchronization service).

At block 604, the device may establish a first FTM session with the initiator device based on a first value of the first trigger field. For example, setting the trigger field to a value of 0 may indicate to the responder to stop sending FTM frames and end the corresponding FTM session that is serving the location services, setting the trigger field to a value of 1 may indicate to the responder to start a burst, such that, in initial FTMR indicates to abort any ongoing FTM sessions serving location services and negotiate a new one for location services. This may not have an impact on any ongoing FTM session serving time synchronization. Setting the trigger field to a value of 2 may indicate to the responder to stop sending FTM frames and end the corresponding FTM session that is serving time synchronization. Setting the trigger field to a value of 3 may indicate to the responder to start a burst, such that, in initial FTMR indicates to abort any ongoing FTM sessions serving time synchronization and negotiate a new one for time synchronization.

At block 606, the device may identify a second FTM request received from the initiator device, wherein the second FTM request comprises a second trigger field, the second trigger field having a second value. For example, when a time synchronization application in the FTM initiator requests an FTM session, the current FTM session aborts and a new FTM session gets established.

At block 608, the device may establish a second FTM session with the initiator device based on the first value and the second value. For example, when the time synchronization application in the FTM initiator requests an FTM session, the 802.11 subsystem in the FTM initiator caches the incoming request and serves the time synchronization application based on the parameters that govern the ongoing FTM session.

It is understood that the above descriptions are for purposes of illustration and are not meant to be limiting.

FIG. 7 shows a functional diagram of an exemplary communication station 700 in accordance with some embodiments. In one embodiment, FIG. 7 illustrates a functional block diagram of a communication station that may be suitable for use as an AP 102 (FIG. 1) or a user device 120 (FIG. 1) in accordance with some embodiments. The communication station 700 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 700 may include communications circuitry 702 and a transceiver 710 for transmitting and receiving signals to and from other communication stations using one or more antennas 701. The transceiver 710 may be a device comprising both a transmitter and a receiver that are combined and share common circuitry (e.g., communication circuitry 702). The communication circuitry 702 may include amplifiers, filters, mixers, analog to digital and/or digital to analog converters. The transceiver 710 may transmit and receive analog or digital signals. The transceiver 710 may allow reception of signals during transmission periods. This mode is known as full-duplex, and may require the transmitter and receiver to operate on different frequencies to minimize interference between the transmitted signal and the received signal. The transceiver 710 may operate in a half-duplex mode, where the transceiver 710 may transmit or receive signals in one direction at a time.

The communications circuitry 702 may include circuitry that can operate the physical layer (PHY) communications and/or media access control (MAC) communications for controlling access to the wireless medium, and/or any other communications layers for transmitting and receiving signals. The communication station 700 may also include processing circuitry 706 and memory 708 arranged to perform the operations described herein. In some embodiments, the communications circuitry 702 and the processing circuitry 706 may be configured to perform operations detailed in FIGS. 1-6.

In accordance with some embodiments, the communications circuitry 702 may be arranged to contend for a wireless medium and configure frames or packets for communicating over the wireless medium. The communications circuitry 702 may be arranged to transmit and receive signals. The communications circuitry 702 may also include circuitry for modulation/demodulation, upconversion/downconversion, filtering, amplification, etc. In some embodiments, the processing circuitry 706 of the communication station 700 may include one or more processors. In other embodiments, two or more antennas 701 may be coupled to the communications circuitry 702 arranged for sending and receiving signals. The memory 708 may store information for configuring the processing circuitry 706 to perform operations for configuring and transmitting message frames and performing the various operations described herein. The memory 708 may include any type of memory, including non-transitory memory, for storing information in a form readable by a machine (e.g., a computer). For example, the memory 708 may include a computer-readable storage device, read-only memory (ROM), random-access memory (RAM), magnetic disk storage media, optical storage media, flash-memory devices and other storage devices and media.

In some embodiments, the communication station 700 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 700 may include one or more antennas 701. The antennas 701 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 700 may include one or more of a keyboard, a display, a non-volatile memory port, multiple antennas, a graphics processor, an application processor, speakers, and other mobile device elements. The display may be an LCD screen including a touch screen.

Although the communication station 700 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 700 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 700 may include one or more processors and may be configured with instructions stored on a computer-readable storage device memory.

FIG. 8 illustrates a block diagram of an example of a machine 800 or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818 (e.g., a speaker), a FTM for time synchronization device 819, a network interface device/transceiver 820 coupled to antenna(s) 830, and one or more sensors 828, such as a global positioning system (GPS) sensor, a compass, an accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

The FTM for time synchronization device 819 may carry out or perform any of the operations and processes (e.g., process 600) described and shown above.

The FTM for time synchronization device 819 may facilitate a mechanism to establish an FTM session and use it for both location services and time synchronization. With this approach the two issues listed above, for example, an ongoing FTM session is aborted due to an incoming request and the execution of the FTM protocol only once for location services or only once for time synchronization, are avoided. This is accomplished without the need to have an arbitration layer to co-ordinate the invocation of FTM sessions.

The FTM for time synchronization device 819 may facilitate that if there are no ongoing FTM sessions, the incoming request (Req_i) for a new FTM session is accepted. If there is an ongoing FTM session (Req_o), the ongoing FTM session is leveraged to serve the new request; and upon the termination of the ongoing FTM session, a new session matching the incoming request (Req_i). Leveraging may include prioritizing a location service and treating a time synchronization service as secondary to the location service. If there is an ongoing location services FTM session, the FTM for time synchronization system may reuse it for time synchronization. If there are no ongoing location services FTM session, the FTM for time synchronization system may start a FTM session for time synchronization. If a request for a FTM session for location services is received, the FTM for time synchronization system may cache the operating parameters to be used for the time synchronization FTM session, then abort the ongoing time synchronization FTM session and start a new one for location services, and if the location services FTM session ends, the FTM for time synchronization system may start a time synchronization FTM session with the cached parameters.

The FTM for time synchronization device 819 may set a trigger field within the iFTMR in order to indicate one or more statuses to the responder. For example, the trigger field may contain 8 bits, where setting the various bits of the trigger field would indicate to the responder on how to handle one or more FTM sessions (location service or time synchronization service). For example, setting the trigger field to a value of 0 may indicate to the responder to stop sending FTM frames and end the corresponding FTM session that is serving the location services, setting the trigger field to a value of 1 may indicate to the responder to start a burst, such that, in initial FTMR indicates to abort any ongoing FTM sessions serving location services and negotiate a new one for location services. This may not have an impact on any ongoing FTM session serving time synchronization. Setting the trigger field to a value of 2 may indicate to the responder to stop sending FTM frames and end the corresponding FTM session that is serving time synchronization. Setting the trigger field to a value of 3 may indicate to the responder to start a burst, such that, in initial FTMR indicates to abort any ongoing FTM sessions serving time synchronization and negotiate a new one for time synchronization. This may not have an impact on any ongoing FTM session serving location services. Further, the values 6 or 7 of the trigger field are used to stop (terminate) and start/continue 'leveraged' mode FTM sessions. Values 4 and 5 may be reserved.

The FTM for time synchronization device 819 may set the session identification (ID) associated with an FTM session to 0 or 1. For example, a session ID of 0 indicates an FTM session for location services, while setting the session ID to 1 an indicates FTM session for time synchronization.

It is understood that the above are only a subset of what the FTM for time synchronization device 819 may be configured to perform and that other functions included throughout this disclosure may also be performed by the FTM for time synchronization device 819.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the invention are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
   determine a first fine timing measurement (FTM) request received from an initiator device, wherein the first FTM request comprises a first trigger field;
   establish a first FTM session with the initiator device based on a first value of the first trigger field;
   identify a second FTM request received from the initiator device, wherein the second FTM request comprises a second trigger field, the second trigger field having a second value; and
   establish a second FTM session with the initiator device based on the first value and the second value.

2. The device of claim 1, wherein the processing circuitry is further configured to:
   assign a first FTM session identification (ID) associated with the first FTM request; and
   assign a second FTM session ID associated with the second FTM request.

3. The device of claim 1, wherein the processing circuitry is further configured to:
   determine the first value of the first trigger field is associated with a location determination of the initiator device; and
   determine the second value of the second trigger field is associated with a time synchronization of the initiator device.

4. The device of claim 1, wherein determining to establish the first FTM session comprises the processing circuitry being further configured to cause to perform one or more first FTM bursts associated with the first FTM request.

5. The device of claim 4, wherein the processing circuitry is further configured to determine to establish the second FTM session using results received during the first FTM bursts.

6. The device of claim 1, wherein the processing circuitry is further configured to:
   determine the first FTM session is associated with time synchronization;
   determine the second FTM session is associated with location determination;
   cause to abort the first FTM session; and
   establish the second FTM session.

7. The device of claim 1, wherein the processing circuitry is further configured to:
   determine the first FTM session is associated with location determination;
   determine the second FTM session is associated with time synchronization;
   determine the first FTM session is terminated; and
   establish the second FTM session after the first FTM session is terminated.

8. The device of claim 1, wherein the processing circuitry is further configured to:
   determine the first FTM session is associated with location determination;
   determine the second FTM session is associated with time synchronization;
   determine to reject the second FTM session; and
   establish the second FTM session after the first FTM session is terminated.

9. The device of claim 1, wherein the processing circuitry is further configured to determine the first FTM session is established independently of the second FTM session.

10. The device of claim 1, further comprising a transceiver configured to transmit and receive wireless signals.

11. The device of claim 10, further comprising an antenna coupled to the transceiver.

12. A non-transitory computer-readable medium storing computer-executable instructions which when executed by one or more processors result in performing operations comprising:

- determining a first fine timing measurement (FTM) request received from an initiator device, wherein the first FTM request comprises a first trigger field;
- establishing a first FTM session with the initiator device based on a first value of the first trigger field;
- identifying a second FTM request received from the initiator device, wherein the second FTM request comprises a second trigger field, the second trigger field having a second value; and
- establishing a second FTM session with the initiator device based on the first value and the second value.

13. The non-transitory computer-readable medium of claim 12, wherein the operations further comprise:

- assigning a first FTM session identification (ID) associated with the first FTM request; and
- assigning a second FTM session ID associated with the second FTM request.

14. The non-transitory computer-readable medium of claim 12, wherein the operations further comprise:

- determining the first value of the first trigger field is associated with a location determination of the initiator device; and
- determining the second value of the second trigger field is associated with a time synchronization of the initiator device.

15. The non-transitory computer-readable medium of claim 12, wherein determining to establish the first FTM session comprises the processing circuitry being further configured to cause to perform one or more first FTM bursts associated with the first FTM request.

16. The non-transitory computer-readable medium of claim 15, wherein the operations further comprise determining to establish the second FTM session using results received during the first FTM bursts.

17. The non-transitory computer-readable medium of claim 12, wherein the operations further comprise:

- determining the first FTM session is associated with time synchronization;
- determining the second FTM session is associated with location determination;
- causing to abort the first FTM session; and
- establishing the second FTM session.

18. The non-transitory computer-readable medium of claim 12, wherein the operations further comprise determining the first FTM session is established independently of the second FTM session.

19. A method comprising:

- determining, by one or more processors, a first fine timing measurement (FTM) request received from an initiator device, wherein the first FTM request comprises a first trigger field;
- establishing a first FTM session with the initiator device based on a first value of the first trigger field;
- identifying a second FTM request received from the initiator device, wherein the second FTM request comprises a second trigger field, the second trigger field having a second value; and
- establishing a second FTM session with the initiator device based on the first value and the second value.

20. The method of claim 19, further comprising:

- assigning a first FTM session identification (ID) associated with the first FTM request; and
- assigning a second FTM session ID associated with the second FTM request.

* * * * *